(12) United States Patent
Hajduk et al.

(10) Patent No.: US 7,013,709 B2
(45) Date of Patent: *Mar. 21, 2006

(54) HIGH THROUGHPUT PREPARATION AND ANALYSIS OF PLASTICALLY SHAPED MATERIAL SAMPLES

(75) Inventors: Damian A. Hajduk, San Jose, CA (US); Oleg Kolosov, San Jose, CA (US)

(73) Assignee: Symyx Technologies, Inc., Santa Clara, CA (US)

(*) Notice: Subject to any disclaimer, the term of this patent is extended or adjusted under 35 U.S.C. 154(b) by 351 days.

This patent is subject to a terminal disclaimer.

(21) Appl. No.: 10/313,477

(22) Filed: Dec. 6, 2002

(65) Prior Publication Data

US 2003/0141613 A1    Jul. 31, 2003

Related U.S. Application Data

(60) Provisional application No. 60/353,912, filed on Jan. 31, 2002.

(51) Int. Cl.
 *G01N 3/10* (2006.01)
(52) U.S. Cl. .............................. 73/37; 73/760; 73/788; 73/864.01
(58) Field of Classification Search ................... 73/819, 73/150 A, 800, 818, 826, 827, 862.041, 862.046; 264/40.3
See application file for complete search history.

(56) References Cited

U.S. PATENT DOCUMENTS

| | | | |
|---|---|---|---|
| 1,870,412 A | 8/1932 | Kennedy |
| 2,590,839 A | 4/1952 | Clapham |
| 2,786,352 A | 3/1957 | Sobota |
| 3,071,961 A | 1/1963 | Heigl et al. |
| 3,151,483 A | 10/1964 | Plummer |
| 3,613,445 A | 10/1971 | Dent et al. |
| 3,618,372 A | 11/1971 | Beckstrom |
| 3,675,475 A | 7/1972 | Weinstein |
| 3,713,328 A | 1/1973 | Aritomi |
| 3,798,960 A | 3/1974 | Glass |
| 3,805,598 A | 4/1974 | Corcoran |
| 3,818,751 A | 6/1974 | Karper et al. |
| 3,835,697 A | 9/1974 | Schneider et al. |
| 3,849,874 A | 11/1974 | Jeffers |
| 3,895,513 A | 7/1975 | Richardson |
| 3,908,441 A | 9/1975 | Virloget |
| 3,933,032 A | 1/1976 | Tschoegl |
| 4,229,979 A | 10/1980 | Greenwood |
| 4,447,125 A | 5/1984 | Lazay et al. |

(Continued)

FOREIGN PATENT DOCUMENTS

CA    2112792    7/1994

(Continued)

OTHER PUBLICATIONS

U.S. Appl. No. 09/939,404 entitled "High Throughput Mechanical Property and Bulge Testing of Material Libraries," (D. Hajduk et al.) filed on Aug. 24, 2001.

(Continued)

*Primary Examiner*—Mark Eashoo
(74) *Attorney, Agent, or Firm*—Dobrusin & Thennisch PC

(57) ABSTRACT

A rapid throughput method for the preparation, analysis or both of libraries of material samples is provided. According to the method, a plurality of samples is provided. The plurality of samples is then formed into a plurality of films. Thereafter, the plurality of films is plastically deformed. Preferably, the plurality of films is deformed into a configuration appropriate for testing of properties or characteristics of the samples.

22 Claims, 4 Drawing Sheets

U.S. PATENT DOCUMENTS

| | | |
|---|---|---|
| 4,517,830 A | 5/1985 | Gunn et al. |
| 4,567,774 A | 2/1986 | Manahan et al. |
| 4,570,478 A | 2/1986 | Soong |
| 4,599,219 A | 7/1986 | Cooper et al. |
| 4,602,501 A | 7/1986 | Hirata |
| 4,605,589 A | 8/1986 | Orphanides |
| 4,680,958 A | 7/1987 | Ruelle et al. |
| 4,685,328 A | 8/1987 | Huebner et al. |
| 4,699,000 A | 10/1987 | Lashmore et al. |
| 4,715,007 A | 12/1987 | Fujita et al. |
| 4,740,078 A | 4/1988 | Daendliker et al. |
| 4,749,854 A | 6/1988 | Martens |
| 4,789,236 A | 12/1988 | Hodor et al. |
| 4,793,174 A | 12/1988 | Yau |
| 4,829,837 A | 5/1989 | Telfer |
| 4,893,500 A | 1/1990 | Fink-Jensen |
| 4,899,575 A | 2/1990 | Chu et al. |
| 4,899,581 A | 2/1990 | Allen et al. |
| 4,926,682 A | 5/1990 | Holm-Kennedy et al. |
| 4,932,270 A | 6/1990 | Lurie et al. |
| 4,975,320 A | 12/1990 | Goldstein et al. |
| 5,008,081 A | 4/1991 | Blau et al. |
| 5,051,239 A | 9/1991 | von der Goltz |
| 5,092,179 A | 3/1992 | Ferguson |
| 5,115,669 A | 5/1992 | Fuller et al. |
| 5,142,900 A | 9/1992 | Duke |
| 5,193,383 A | 3/1993 | Burnham et al. |
| 5,236,998 A | 8/1993 | Lundeen et al. |
| 5,269,190 A | 12/1993 | Kramer et al. |
| 5,271,266 A | 12/1993 | Eschbach |
| 5,272,912 A | 12/1993 | Katsuzaki |
| 5,280,717 A | 1/1994 | Hoseney et al. |
| 5,303,030 A | 4/1994 | Abraham et al. |
| 5,305,633 A | 4/1994 | Weissenbacher et al. |
| 5,398,885 A | 3/1995 | Andersson et al. |
| 5,437,192 A | 8/1995 | Kawamoto et al. |
| 5,438,863 A | 8/1995 | Johnson |
| 5,452,614 A | 9/1995 | Kato et al. |
| 5,452,619 A | 9/1995 | Kawanabe et al. |
| 5,481,153 A | 1/1996 | Turner |
| 5,517,860 A | 5/1996 | Lin et al. |
| 5,520,042 A | 5/1996 | Garritano et al. |
| 5,532,942 A | 7/1996 | Kitamura et al. |
| 5,610,325 A | 3/1997 | Rajagopal et al. |
| 5,614,662 A | 3/1997 | Hallan et al. |
| 5,626,779 A | 5/1997 | Okada |
| 5,699,159 A | 12/1997 | Mason |
| 5,700,953 A | 12/1997 | Hlady et al. |
| 5,723,792 A | 3/1998 | Miyazaki |
| 5,728,532 A | 3/1998 | Ackley |
| 5,756,883 A | 5/1998 | Forbes |
| 5,764,068 A | 6/1998 | Katz et al. |
| 5,776,359 A | 7/1998 | Schultz et al. |
| 5,795,989 A | 8/1998 | Simmons et al. |
| 5,817,947 A | 10/1998 | Bergerus |
| 5,821,407 A | 10/1998 | Sekiguchi et al. |
| 5,847,283 A | 12/1998 | Finot et al. |
| 5,877,428 A | 3/1999 | Scolton |
| 5,892,157 A | 4/1999 | Syre |
| 5,922,967 A | 7/1999 | Motoyama |
| 5,959,297 A | 9/1999 | Weinberg et al. |
| 5,985,356 A | 11/1999 | Schultz et al. |
| 5,999,887 A | 12/1999 | Giannakopoulos et al. |
| 6,004,617 A | 12/1999 | Schultz et al. |
| 6,010,616 A | 1/2000 | Lewis et al. |
| 6,013,199 A | 1/2000 | McFarland et al. |
| 6,030,917 A | 2/2000 | Weinberg et al. |
| 6,033,913 A | 3/2000 | Morozov et al. |
| 6,034,240 A | 3/2000 | La Pointe |
| 6,034,775 A | 3/2000 | McFarland et al. |
| 6,040,193 A | 3/2000 | Winkler et al. |
| 6,043,317 A | 3/2000 | Mumick et al. |
| 6,043,363 A | 3/2000 | LaPointe et al. |
| 6,045,671 A | 4/2000 | Wu et al. |
| 6,050,138 A | 4/2000 | Lynch et al. |
| 6,050,139 A | 4/2000 | Bousfield et al. |
| 6,087,181 A | 7/2000 | Cong |
| 6,092,414 A | 7/2000 | Newman |
| 6,124,476 A | 9/2000 | Guram et al. |
| 6,149,882 A | 11/2000 | Guan et al. |
| 6,151,123 A | 11/2000 | Nielsen |
| 6,157,449 A | 12/2000 | Hajduk |
| 6,175,409 B1 | 1/2001 | Nielsen et al. |
| 6,177,528 B1 | 1/2001 | LaPointe et al. |
| 6,182,499 B1 | 2/2001 | McFarland et al. |
| 6,187,164 B1 | 2/2001 | Warren et al. |
| 6,203,726 B1 | 3/2001 | Danielson et al. |
| 6,225,487 B1 | 5/2001 | Guram |
| 6,225,550 B1 | 5/2001 | Hornbostel et al. |
| 6,230,548 B1 | 5/2001 | Han et al. |
| 6,242,623 B1 | 6/2001 | Boussie et al. |
| 6,248,540 B1 | 6/2001 | Weinberg et al. |
| 6,260,407 B1 | 7/2001 | Petro et al. |
| 6,265,226 B1 | 7/2001 | Petro et al. |
| 6,265,601 B1 | 7/2001 | Guram et al. |
| 6,267,011 B1 | 7/2001 | Kurtz et al. |
| 6,268,513 B1 | 7/2001 | Guram et al. |
| 6,294,388 B1 | 9/2001 | Petro |
| 6,296,771 B1 | 10/2001 | Miroslav |
| 6,306,658 B1 | 10/2001 | Turner et al. |
| 6,315,923 B1 | 11/2001 | Devenney et al. |
| 6,321,594 B1 | 11/2001 | Brown et al. |
| 6,326,090 B1 | 12/2001 | Schultz et al. |
| 6,336,353 B1 | 1/2002 | Matsiev et al. |
| 6,371,640 B1 | 4/2002 | Hajduk et al. |
| 6,393,898 B1 | 5/2002 | Hajduk et al. |
| 6,438,497 B1 | 8/2002 | Mansky et al. |
| 6,650,102 B1 * | 11/2003 | Hajduk et al. ............ 324/76.49 |
| 6,690,179 B1 * | 2/2004 | Hajduk et al. ............... 324/663 |
| 6,772,642 B1 * | 8/2004 | Hajduk et al. ................. 73/819 |

FOREIGN PATENT DOCUMENTS

| | | |
|---|---|---|
| EP | 0 317 356 | 5/1989 |
| EP | 0 406 413 A1 | 1/1991 |
| EP | 1 158 290 A2 | 11/2001 |
| JP | 401229934 A | 9/1989 |
| JP | 402297040 A | 12/1990 |
| WO | WO 96/11878 | 4/1996 |
| WO | WO 98/15501 | 4/1998 |
| WO | WO 99/18431 | 4/1999 |
| WO | WO 00/17413 | 3/2000 |
| WO | WO 00/23921 | 4/2000 |
| WO | WO 00/36410 A1 | 6/2000 |
| WO | WO 00/40331 | 7/2000 |
| WO | WO 00/51720 | 9/2000 |
| WO | WO 00/67086 | 11/2000 |
| WO | WO 01/79949 A2 | 10/2001 |

OTHER PUBLICATIONS

U.S. Appl. No. 09/939,252 entitled "High Throughput Mechanical Rapid Serial Property Testing of Material Libraries," (P. Mansky) filed on Aug. 24, 2001.

U.S. Appl. No. 09/939,139 entitled "High Throughput Fabric Handle Screening," (M. Kossuth et al.) filed on Aug. 24, 2001.

U.S. Appl. No. 09/939,149 entitled "High Throughput Rheological Testing of Materials," (P. Mansky et al.) filed on Aug. 24, 2001.

U.S. Appl. No. 09/939,263 entitled "High Throughput Mechanical Property Testing of Materials Libraries Using Capacitance," (D. Hajduk et al.) filed on Aug. 24, 2001.

The family of applications for U.S. Appl. No. 09/580,024 entitled "Instrument for High Throughput Measurement of Material Physical Properties and Method of Using Same," (Carlson, et al.) filed on May 26, 2000.
U.S. Appl. No. 09/938,994 entitled "High Throughput Mechanical Property Testing of Material Libraries Using a Piezoelectric," (D. Hajduk) filed on Aug. 24, 2001.
U.S. Provisional Patent Appl. No. 60/371,357 filed on Apr. 10, 2002.
U.S. Appl. No. 10/133,938 filed Apr. 26, 2002.
U.S. Appl. No. 10/225,942 filed Aug. 22, 2002.
U.S. Appl. No. 10/291,108 filed Nov. 8, 2002.
U.S. Appl. No. 09/420,334 entitled "Graphic Design of Combinatorial Material Libraries" (Lacy, et al.) filed on Oct. 18, 1999.
U.S. Appl. No. 09/305,830 titled "Synthesizing Combinatorial Libraries of Materials" (Rust, et al.) filed on May 5, 1999.
U.S. Appl. No. 09/550,549 entitled "Automated Process Control And Data Management System And Methods" (Crevier, et al.) filed on Apr. 14, 2000.
U.S. Appl. No. 09/755,623 entitled "Laboratory Database System and Methods For Combinatorial Materials Research" (Dorsett, Jr., et al.) filed on Jan. 5, 2001.
The family of applications for U.S. Appl. No. 09/227,558 entitled, "Apparatus and Method of Research for Creating and Testing Novel Catalysts, Reactions and Polymers" (Turner et al.) filed Jan. 8, 1999.
U.S. Appl. No. 09/235,368 entitled "Polymerization Method From the Combinatorial Synthesis and Analysis of Organometallic Compounds and Catalysts" (Weinberg et al.) filed on Jan 21, 1999.
U.S. Provisional Appl. No. 60/122,704 entitled "Controlled. Stable Free Radical Emulsion and Water-Based Polymerizations" (Klaemer et al.) filed on Mar. 9, 1999.
The family of applications for U.S. Appl. No. 09/567,598 entitled "Polymer Libraries on a Substrate, Method for Forming Polymer Libraries on a Substrate and Characterization Methods with Same" (Boussie et al.) filed May 10, 2000.
The family of applications for U.S. Appl. No. 09/174,856 titled "Graphic Design of Combinatorial Material Libraries" (Lacy, et al.) filed on Oct. 19, 1998.
The family of applications for U.S. Appl. No. 09/156,827 entitled "Formation of Combinatorial Arrays of Materials Using Solution-Based Methodologies" (Giaquinta et al.) filed Sep. 18, 1998.
U.S. Appl. No. 09/579,338 entitled "Rheo-Optical Indexer and Method of Screening and Characterizing Arrays of Materials" (Carlson et al.) filed on May 25, 2000.
U.S. Appl. No. 09/215,417 filed Dec. 18, 1998.
U.S. Appl. No. 09/667,119 filed Sep. 20, 2000.
U.S. Appl. No. 09/954,449 filed Sep. 17, 2001.
U.S. Appl. No. 60/300,792 filed Jun. 25, 2001.

"DMA 2980 Dynamic Mechanical Analyer," http://www.tainst.com/dma2.html. Dec. 29, 2000.
"Introducing the NEW DMTA V!", http://www.rheometricscientific.com/dmtaV.htm, Dec. 29, 2000.
"Standard Test Method for Rubber Property-Intrenational Hardness," American Society for Testing and Materials.
Amitay-Sadovsky, Ella and H. Daniel Wagner, "Evaluation of Young's Modulus of Polymers from Knoop Microindentation Tests" Polymer Communications, 1998. vol. 39, No. 11. pp. 2387-2390.
Calleja, F.J. Balta, "Microhardness Studies of Polymers and Their Transitions" TRIP, Dec. 1994, vol. 2. No. 12, pp. 419-425.
Bowlt, C., "A Simple Capillary Viscometer" Physics Education, Mar. 1975, vol. 10, No. 2, pp. 102-103.
Lacombe, Robert H. and Jeremy Greenblatt, "Mechanical Propoerties of Thin Polyimide Films" pp. 647-668.
Shinozaki, D.M. and Y. Lu, "Micro-Indentation Relaxation Measurements in Polymer Thin Films" Journal of Electronic Materials, 1997, vol. 26, No. 7, pp. 852-858.
Wierenga, P.E. and A.J.J. Franken, "Ultramicroindentation Apparatus for the Mechanical Characterization of Thin Films" J. Appl. Phys. Jun. 15, 1984. 55 (12).
European Search Report dated Dec. 10, 2001.
Odian, Principles of Polymerization, 3rd Ed., John Wiley & Sons, Inc. (1991).
Young, W.C., Roark's Formulas for Stress and Stain, 1989.
Timoshenko, S., Theory of Plates and Shells, McGraw-Hill, New York 1940.
Osterberg, Peter M. and Stephen D. Senturia, "M-TEST: A Test Chip for MEMS Material Property Measurement Using Electrostatically Actuated Test Structures," Journal of Microelectromechanical Systmes, vol. 6, No. 2, Jun. 1997.
Kim, J.O. and B. Lewis Slaten, "Objective Assessment of Fabric Handle in Fabrics Treated With Flame Retardants," Journal of Testing and Evaluation, JTEVA, vol. 24, No. 4, Jul. 1996, pp. 223-228.
Grover, G. et al., "A Screening Technique for Fabric Handle", J. Text. Inst., 1993, 84 No. J. Textile Institute, pp. 486-494.
Pan, Ning and K.C. Yen, "Physical Interpretations of Curves Obtained Through the Fabric Extraction Process for Handle Measurement," Textile Research Journal 62(5), pp. 279-290 (1992).
"Handle-O-Meter", Thwing-Albert Instrument Company, Philadelphia, PA.
Raeel, Mastura and Jiang Liu, "An Empirical Model for Fabric Hand" Textile Research Journal 62, 1, pp. 31-38 (1991).
Ali, S.I. and Shahida Begum, "Fabric Softeners and Softness Perception", Ergonomics, v.37, No. 5, pp. 801-806 (1994).

* cited by examiner

FIG. 4
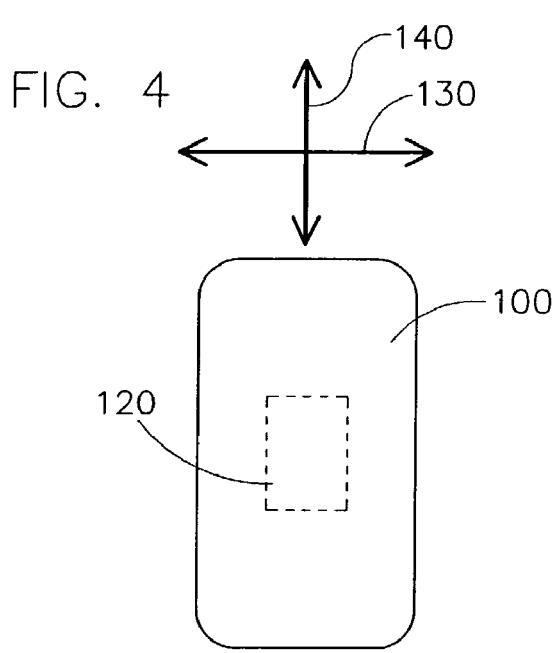
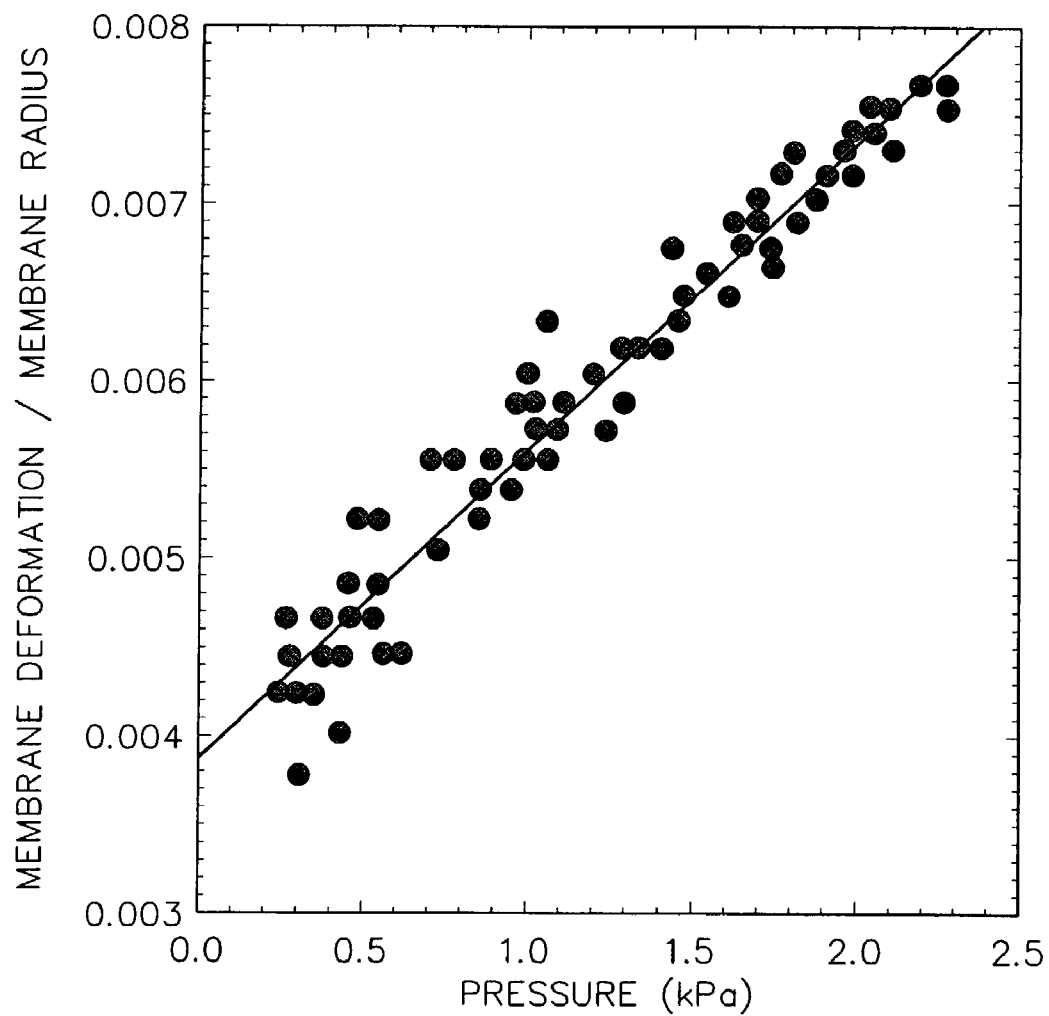
FIG. 6

HIGH THROUGHPUT PREPARATION AND ANALYSIS OF PLASTICALLY SHAPED MATERIAL SAMPLES

CLAIM OF BENEFIT OF FILING DATE

The present application claims the benefit of the filing date of U.S. Provisional Application Ser. No. 60/353,912 (Filed Jan. 31, 2002), hereby incorporated by reference.

FIELD OF THE INVENTION

The present invention generally relates to methods for high throughput preparation and analysis of materials, and more particularly to the high throughput preparation and analysis of libraries of materials (e.g., polymer materials or blends including polymers) for the discovery of new materials or the rapid characterization of existing materials.

BACKGROUND OF THE INVENTION

The discovery of new materials with novel chemical and physical properties often leads to the development of new and useful technologies. Over forty years ago, for example, the preparation of single crystal semiconductors transformed the electronics industry. Currently, there is a tremendous amount of activity being carried out in the areas of new solid materials. Unfortunately, even though the chemistry of extended solids has been extensively explored, few general principles have emerged that allow one to predict with certainty, composition, structure and reaction pathways for the synthesis of such solid state compounds, compositions or structures. Moreover, it is difficult to predict a priori the physical properties or the microstructure that a particular material will possess.

Clearly, the preparation of new materials with novel chemical and physical properties is at best happenstance with our current level of understanding. Consequently, the discovery of new materials or materials with desirable properties (e.g., physical properties) can depend largely on the ability to synthesize and analyze (e.g., screen) materials, compounds, compositions or structures. Moreover, such discovery can be depend upon the ability to form or process sample materials in a manner that allows for useful screening of the materials. As an example, screening materials such as polymers, thermoplastics, elastomers, combinations thereof or the like may be more useful if the materials have been formed or have undergone processing that simulates industrially important processing. Thus, it may be desirable to form combinatorial libraries of samples that have been processed according to one or more methods that simulate industrially significant processes (e.g., molding techniques such as blow molding, injection molding or the like).

As such, there exists a need in the art for more efficient, economical and systematic approaches for the preparation of materials and for the screening of such materials for information potentially bearing upon the actual useful properties of the materials.

Schultz et al., in U.S. Pat. No. 5,985,356 entitled "Combinatorial Synthesis of Novel Materials" disclose methods for preparing and screening arrays of materials for combinatorial material science applications, and is incorporated herein by reference.

This invention provides methods and apparatus for the formation of combinatorial libraries or arrays of polymer and other materials by effectively utilizing a certain combination of steps or structures. The invention can be used to make or process known materials or new materials. The present invention can be particularly attractive for preparing polymer or polymer blend samples.

SUMMARY OF THE INVENTION

The present invention provides a rapid throughput method for the research and development or other analysis of commercially attractive polymer or other materials, including the steps of providing a library of material samples in a first state. Thereafter, each of the samples is plastically deformed to a second state. Preferably, each of the samples is plastically deformed in a first direction and a second direction, although not required. The materials, while in the second state, are then analyzed for a particular characteristic preferably using a high throughput analytical technique. In one highly preferred embodiment, polymer samples are deposited upon a substrate and subjected to biaxial flow conditions for achieving plastic deformation.

The present invention advantageously permits for the rapid throughput formation of materials in a format compatible with and appropriate for rapid combinatorial synthesis and screening, for rapid discovery of new processing or treatment conditions, for rapid characterization of new or existing materials, a combination thereof or otherwise for improving high throughput material research techniques.

DESCRIPTION OF DRAWINGS

FIG. 4 illustrates a top view of a sample after having been processed according to the exemplary method shown in FIGS. 3(a)–3(d).

FIG. 6 is a graph of data taken from samples formed and processed in accordance with the present invention.

DETAILED DESCRIPTION OF PREFERRED EMBODIMENT

Figure 1:
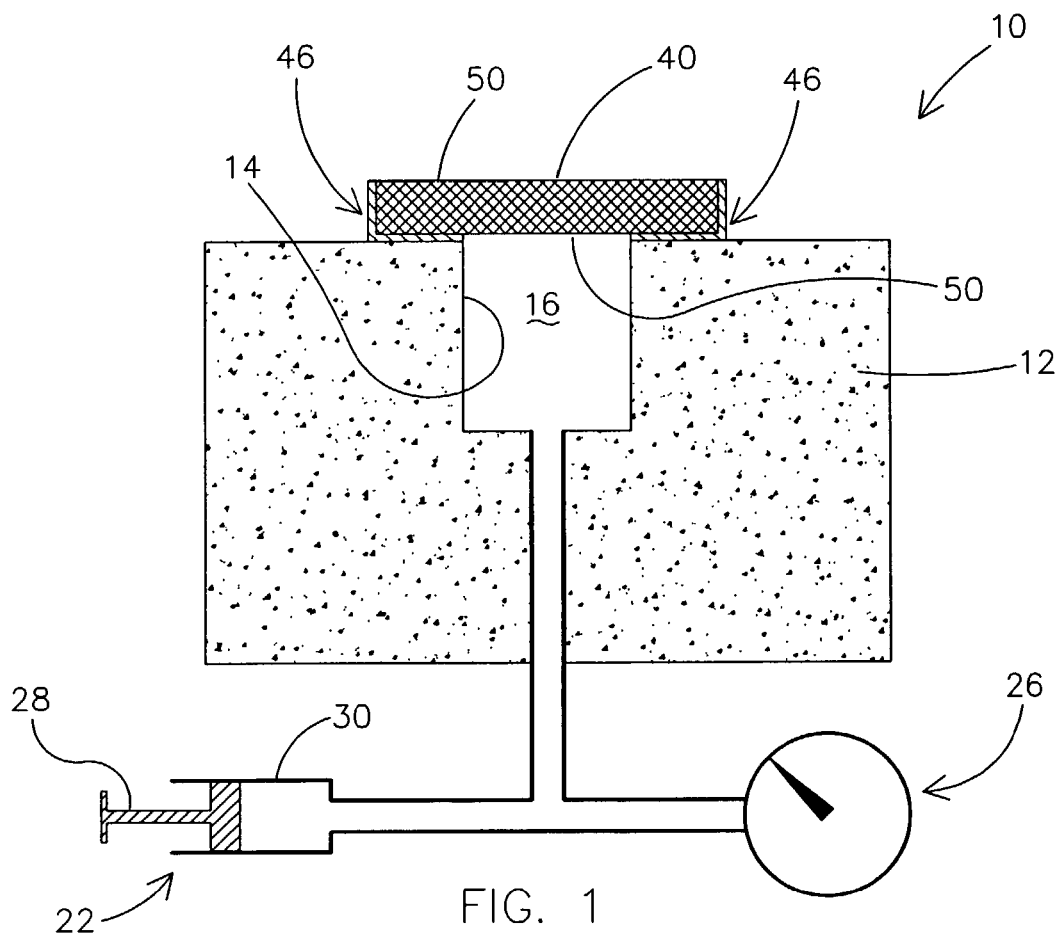
FIG. 1 illustrates a schematic of an exemplary apparatus for forming material samples according to the present invention.

The present invention provides a method for the research and development of commercially attractive materials that, preferably, includes the steps of:

1) Providing a library of material samples;
2) Plastically deforming the library of material samples; and
3) Optionally, subjecting the samples to analysis of at least one characteristic thereof.

The present invention in particular makes use of the application of a force (e.g., a pressure) and, optionally, the application of various other conditions applied to a library of samples to achieve a desired plastic deformation of the samples. According to an aspect of the invention, the step of plastically deforming the material samples provides the material samples in a format suitable for analysis for determining a characteristic or property of the samples. Alternatively, however, the samples may be used for a variety of other purposes as well.

Sample Materials

The samples for which the present invention is useful for screening include polymeric materials or any other liquid, semi-solid, or solid material that is capable of being provided as a high viscosity fluid, solid, or other suitable form, or is capable of undergoing deformation (e.g., biaxial deformation which may involve flow, stretching, expansion, contraction of the like). Accordingly, without limitation, pure materials, blends of materials, bulk materials, particles of materials, thin films of materials, dispersions of materials, emulsions of materials, and solutions of materials are all contemplated as within the useful scope of the present invention.

The present invention may also be useful for forming and screening combinatorial libraries chosen from a wide variety of materials, including but not limited to, metals, ceramics, composites, organic materials, inorganic material, flocculated materials, colloids, non-volatile materials, soluble materials, combinations thereof and the like. Other materials appropriate for combinatorial research, either by direct or indirect analytical techniques, may include, for instance, catalysts, products of various polymerization reaction conditions, lubricants, gels, adhesives, coatings and/or products of new post-synthesis processing conditions. Other materials appropriate for combinatorial research, either by direct or indirect analytical techniques, according to the present invention may include, but are not limited to, foodstuffs, cosmetics, beverages, lotions, creams, pharmaceuticals, inks, body fluids, fuels, additives, detergents, surfactants, shampoos, conditioners, dyes, waxes, fuel cell electrolytes, photoresist, semiconductor material, wire coatings, hair styling products and the like. The system may also be used to analyze organic or biological materials including but not limited to pharmaceutical compounds and polymorphs thereof, salts of small organic molecules or other non-biological or biological materials.

It will be appreciated that this invention lends itself well to providing useful methods for a combinatorial materials science research program for the high throughput preparation or analysis of materials. The present invention has been found particularly useful in connection with the processing and testing of, amongst other materials, polymeric materials or blends including the same. In this regard, the present invention can be employed to investigate any of a number of different types of polymeric material including homogeneous blends, heterogeneous blends, interpenetrating networks, copolymers, composites, or other materials.

In a particularly preferred embodiment, the present invention is employed for screening polymer samples, or plastic samples including polymers. Accordingly, unless otherwise stated, reference to screening of polymers or other processing of polymers includes plastics, elastomers, thermoplastics, plastomers, other materials incorporating polymers or combinations thereof. The polymer sample can be a homogeneous polymer sample or a heterogeneous polymer sample, and in either case, comprises one or more polymer components. As used herein, the term "polymer component" refers to a sample component that includes one or more polymer molecules. The polymer molecules in a particular polymer component can have the same repeat unit, and can be structurally identical to each other or structurally different from each other. For example, a polymer component may comprise a number of different molecules, with each molecule having the same repeat unit, but with a number of molecules having different molecular weights from each other (e.g., due to a different degree of polymerization). As another example, a heterogeneous mixture of copolymer molecules may, in some cases, be included within a single polymer component (e.g., a copolymer with a regularly-occurring repeat unit), or may, in other cases, define two or more different polymer components (e.g., a copolymer with irregularly-occurring or randomly-occurring repeat units). Hence, different (polymer components include polymer molecules having different repeat units. It is possible that a particular polymer sample (e.g., a member of a library) will not contain a particular polymer molecule or polymer component of interest.

In one embodiment, the polymer molecule of the polymer component is preferably, but need not be, a non-biological polymer. A non-biological polymer is, for purposes herein, a polymer other than an amino-acid polymer (e.g., protein) or a nucleic acid polymer (e.g., deoxyribonucleic acid (DNA)). However, the employment of the present invention for screening of materials for use as biological implants or prosthetics is contemplated. Further, the ability of a biological polymer to bind to an agent may be determined from the mechanical property response of a sample of the material in the presence of such agent.

The polymer molecule of the polymer component is, however, not generally critical; that is, the systems and methods disclosed herein will have broad application with respect to the type (e.g., architecture, composition, synthesis method or mechanism) and/or nature (e.g., physical state, form, attributes) of the polymer. Hence, the polymer molecule can be, with respect to homopolymer or copolymer architecture, a linear polymer, a branched polymer (e.g., short-chain branched, long-chained branched, hyper-branched), a cross-linked polymer, a cyclic polymer or a dendritic polymer. A copolymer molecule can be a random copolymer molecule, a block copolymer molecule (e.g., di-block, tri-block, multi-block, taper-block), a graft copolymer molecule or a comb copolymer molecule.

The particular composition of the polymer molecule is not critical. The material may be thermoplastic, thermoset or a mixture thereof. It may be a polycondensate, polyadduct, a modified natural polymer. Exemplary materials include polymers incorporating olefins, styrenes, acrylates, methacrylates, polyimides, polyamides, epoxies, silicones, phenolics, rubbers, halogenated polymers, polycarbonates, polyketones, urethanes, polyesters, silanes, sulfones, allyls, polyphenylene oxides, terphthalates, or mixtures thereof. Other specific illustrative examples can include repeat units or random occurrences of one or more of the following, without limitation: polyethylene, polypropylene, polystyrene, polyolefin, polyamide, polyimide, polyisobutylene, polyacrylonitrile, poly(vinyl chloride), poly(methyl methacrylate), poly(vinyl acetate), poly(vinylidene chloride), polytetrafluoroethylene, polyisoprene, polyacrylamide, polyacrylic acid, polyacrylate, poly(ethylene oxide), poly (ethyleneimine), polyamide, polyester, polyurethane, polysiloxane, polyether, polyphosphazine, polymethacrylate, and polyacetals. Polysaccharides are also preferably included within the scope of polymers. Exemplary naturally-occurring polysaccharides include cellulose, dextran, gums (e.g., guar gum, locust bean gum, tamarind xyloglucan, pullulan), and other naturally-occurring biomass. Exemplary semi-synthetic polysaccharides having industrial applications include cellulose diacetate, cellulose triacetate, acylated cellulose, carboxymethyl cellulose and hydroxypropyl cellulose. In any case, such naturally-occurring and semi-synthetic polysaccharides can be modified by reactions such as hydrolysis, esterification, alkylation, or by other reactions.

In typical applications, a polymer sample is a heterogeneous sample comprising one or more polymer components and/or one or more monomer components. In copolymer applications, the polymer sample can comprise one or more copolymers, a first comonomer, a second comonomer and/or additional comonomers.

The polymer samples can, in any case, also include other components, such as catalysts, catalyst precursors (e.g., ligands, metal-precursors), solvents, initiators, additives, products of undesired side-reactions (e.g., polymer gel, or undesired homopolymer or copolymers) and/or impurities. Typical additives include, for example, surfactants, fillers, reinforcements, flame retardants, colorants, environmental protectants, other performance modifiers, control agents, plasticizers, cosolvents and/or accelerators, among others. In this regard, the present invention is particularly attractive for the screening of effects of variations of additives upon the characteristics of the material.

According to one embodiment, samples may be varied relative to each other by the amount, type or the like of one or more additives in the samples. For example, according to a preferred embodiment, samples are varied relative to each other by the amount or type of an additive that effects the moldability, or other characteristics (e.g., strength, corrosion resistance, elasticity or the like) of the samples. Examples of such additives include elasticity modifiers (e.g., plasticizers), strength modifies, cross-linkers, molecular weight modifiers, stiffeners or the like.

In one preferred embodiment, the polymer samples of the present invention are melted or otherwise heated to a high viscosity fluid state, with the resulting material constituting a high viscosity fluid sample. Heating may be performed simultaneously while the samples are on a common substrate. Alternatively, the sample is heated to liquefy it or maintain its liquidity while being transferred to a common substrate (e.g., while in a probe of an automated sampler).

In another embodiment at a point prior to, during, or after depositing the sample onto the substrate, the polymer sample is preferably, chemically treated to form a liquid polymer sample, such as a polymer solution, a polymer emulsion, a polymer dispersion or a polymer that is liquid in the pure state (i.e., a neat polymer). A polymer solution comprises one or more polymer components dissolved in a solvent. The polymer solution can be of a form that includes well-dissolved chains and/or dissolved aggregated micelles. The solvent can vary, depending on the application, for example with respect to polarity, volatility, stability, and/or inertness or reactivity. Typical solvents include, for example, tetrahydrofuran (THF), toluene, hexane, ethers, trichlorobenzene, dichlorobenzene, dimethylformamide, water, aqueous buffers, alcohols, etc. According to traditional chemistry conventions, a polymer emulsion can be considered to comprise one or more liquid-phase polymer components emulsified (uniformly or non-uniformly) in a liquid continuous phase, and a polymer dispersion can be considered to comprise solid particles of one or more polymer components dispersed (uniformly or non-uniformly) in a liquid continuous phase. The polymer emulsion and the polymer dispersion can also be considered, however, to have the more typically employed meanings specific to the art of polymer science—of being an emulsion-polymerization product and dispersion-polymerization product, respectively. In such cases, for example, the emulsion polymer sample can more generally include one or more polymer components that are insoluble, but uniformly dispersed, in a continuous phase, with typical emulsions including polymer component particles ranging in diameter from about 1 nm to about 500 nm, more typically from about 5 nm to about 300 nm, and even more typically from about 40 nm to about 200 nm. The dispersion polymer sample can, in such cases, generally include polymer component particles that are dispersed (uniformly or nonuniformly) in a continuous phase, with typical particles having a diameter ranging from about 0.2 um to about 1000 um, more typically from about 0.4 um to about 500 um, and even more typically from about 0.5 um to about 200 um. Exemplary polymers that can be in the form of neat polymer samples include dendrimers, and siloxane, among others. The high viscosity fluid polymer sample can also be employed in the form of a slurry, a latex, a microgel, a physical gel, or in any other form sufficient for creating an array for screening analysis as described and claimed herein. In some cases, polymer synthesis reactions (i.e., polymerizations) directly produce high viscosity fluid samples. In other cases, the polymer may be synthesized, stored or otherwise available for characterization in a non-liquid physical state, such as a solid state (e.g., crystalline, semicrystalline or amorphous), a glassy state or rubbery state. The polymer sample can, regardless of its particular form, have various attributes, including variations with respect to polarity, solubility and/or miscibility.

In preferred applications, the polymer sample is a polymerization product mixture. As used herein, the term "polymerization product mixture" refers to a mixture of sample components obtained as a product from a polymerization reaction. An exemplary polymerization product mixture can be a sample from a combinatorial library prepared by polymerization reactions, or can be a polymer sample drawn off of an industrial process line. In general, the polymer sample may be obtained after the synthesis reaction is stopped or completed or during the course of the polymerization reaction. Alternatively, samples of each polymerization reaction can be taken and placed into an intermediate vessel at various times during the course of the synthesis, optionally with addition of more solvent or other reagents to arrest the synthesis reaction or prepare the samples for analysis. These intermediate samples can then be characterized at any time without interrupting the synthesis reaction.

It is also possible to use polymer samples or libraries of polymer samples that were prepared previously and stored. Typically, polymer libraries can be stored with agents to ensure polymer integrity. Such storage agents include, for example, antioxidants or other agents effective for preventing cross-linking of polymer molecules during storage. Depending upon the polymerization reaction, other processing steps may also be desired, all of which are preferably automated.

The polymerization scheme and/or mechanism by which the polymer molecules of the polymer component of the sample are prepared is not critical, and can include, for example, reactions considered to be addition polymerization, condensation polymerization, step-growth polymerization, and/or chain-growth polymerization reactions. Viewed from another aspect, the polymerization reaction can be an emulsion polymerization or a dispersion polymerization reaction. Viewed more specifically with respect to the mechanism, the polymerization reaction can be free radical polymerization, ionic polymerization (e.g., cationic polymerization, anionic polymerization), and/or ring-opening polymerization reactions, among others. Non-limiting examples of the foregoing include, Ziegler-Natta or Kaminsky-Sinn reactions and various copolymerization reactions.

Polymerization product mixtures can also be prepared by modification of a polymeric starting materials, by grafting reactions, chain extension, chain scission, functional group interconversion, or other reactions.

It will be appreciated that in certain embodiments, a polymer sample is formed in situ on a substrate, post synthesis treated in situ on a substrate, or a combination thereof. Examples of such post synthesis treatment steps include for instance, heat treating, environmental exposure (e.g., temperature moisture, radiation, chemicals, etc.), aged, or the like.

In other preferred embodiments, polymer or other sample materials may be provided as solids or semi-solids. Such samples may be provided in a variety of geometric configurations such as blocks, cylinders, loops, films and the like. Generally, geometric configurations are selected to be appropriate for one or more tests that are to be performed upon the samples. Solid and semi-solid samples may be rigid, elastic, gelatinous or otherwise. In one preferred embodiment, samples are provided in a tacky state, and thus exhibit at least some degree of adhesiveness within the range of temperature under examination. Samples may also be specifically arranged for testing. For example, samples may be interwoven as a fabric, unwoven, machined to shape, molded to shape, cut to shape or otherwise physically manipulated for testing.

Sample Size

The sample size can generally vary, depending on the particular characterization protocols and systems used to analyze the sample or components thereof. However, it will be appreciated that the present invention advantageously permits for attaining reliable data with relatively small samples. Typical sample sizes can range from about 0.1 microgram to about 20 grams, more typically from about 1 microgram to about 1 gram, even more typically from about 5 micrograms to about 100 milligrams, and still more typically from about 10 micrograms to about 1000 micrograms, and even still more typically from about 20 micrograms to about 50 micrograms.

If and when placed on a substrate for forming a library, as discussed herein with regard to sampling, the samples may be dispensed with any suitable dispensing apparatus (e.g., an automated micropipette or capillary dispenser, optionally with a heated tip). Each sample of the library is dispensed to an individually addressable region on the substrate. Generally, each sample occupies no more than about 1000 mm$^2$ of area on a substrate surface, preferably no more than about 100 mm$^2$, more preferably no more than about 50 mm$^2$, even more preferably no more than about 30 mm$^2$, most preferably no more than about 20 mm$^2$, and it is possible for a sample to occupy less than about 5 mm$^2$. The sample is preferably to have a thickness that is less than about 500 $\mu$m, preferably less than about 300 $\mu$m, even more preferably less than about 250 $\mu$microns, most preferably less than about 150 $\mu$m, and it is possible for a sample to have a thickness that is less than about 50 $\mu$m.

In applications where the sample is disposed in a well, preferably the sample size does not exceed about 1000 milligrams. Accordingly, for dispensing high viscosity fluid samples, the individual samples are each dispensed in amounts no greater than about 100 ml, more preferably no greater than about 10 ml and still more preferably no greater than about 1 ml.

Libraries of Sample Materials

Libraries of samples have 2 or more samples that are physically or temporally separated from each other—for example, by residing in different regions of a common substrate, in different substrates, in different sample containers of a common substrate, by having a membrane or other partitioning material positioned between samples, or otherwise. The plurality of samples preferably has at least 4 samples and more preferably at least 8 samples. Four samples can be employed, for example, in connection with experiments having one control sample and three polymer samples varying (e.g., with respect to composition or process conditions as discussed above) to be representative of a high, a medium and a low-value of the varied factor—and thereby, to provide some indication as to trends. Four samples are also a minimum number of samples to effect a serial-parallel characterization approach, as described above (e.g., with two analytical instruments operating in parallel). Eight samples can provide for additional variations in the explored factor space. Moreover, eight samples corresponds to the number of parallel polymerization reactors in the PPR-8™, being selectively offered as one of the Discovery Tools™ of Symyx Technologies, Inc. (Santa Clara, Calif.), which can be used to prepare polymers for screening in accordance with the present invention. Higher numbers of samples can be investigated, according to the methods of the invention, to provide additional insights into larger compositional and/or process space. In some cases, for example, the plurality of samples can be 15 or more samples, preferably 20 or more samples, more preferably 40 or more samples and even more preferably 80 or more samples. Such numbers can be loosely associated with standard configurations of other parallel reactor configurations for synthesizing materials for screening herein (e.g., the PPR-48™, Symyx Technologies, Inc.) or of standard sample containers (e.g., 96-well microtiter plate-type formats). Moreover, even larger numbers of samples can be characterized according to the methods of the present invention for larger scale research endeavors. Hence, for screening of polymers or other materials the number of samples can be 150 or more, 400 or more, 500 or more, 750 or more, 1,000 or more, 1,500 or more, 2,000 or more, 5,000 or more and 10,000 or more samples. As such, the number of samples can range from about 2 samples to about 10,000 samples or more, and preferably from about 8 samples to about 10,000 or more samples. In many applications, however, the number of samples can range from about 80 samples to about 1500 samples.

In some cases, in which processing of samples using typical 96-well microtiter-plate formatting or scaling is convenient or otherwise desirable, the number of samples can be 96*N, where N is an integer ranging from about 1 to about 100 or greater. For many applications, N can suitably range from 1 to about 20, and in some cases, from 1 to about 5.

A library of samples comprises two or more different samples spatially separated—preferably, but not necessarily on a common substrate, or temporally separated. Candidate samples (i.e., members) within a library may differ in a definable and typically predefined way, including with regard to chemical structure, processing (e.g., synthesis) history, mixtures of interacting components, post-synthesis treatment, purity, etc. The samples are spatially separated, preferably at an exposed surface of the substrate, such that the library of samples is separately addressable for characterization thereof. The two or more different samples can, during one or more stages of processing, reside in sample containers formed as wells in a surface of the substrate. The number of samples included within the library can generally be the same as the number of samples included within the plurality of samples, as discussed above. In general, however, not all of the samples within a library of samples need to be different samples. When process conditions are to be evaluated, the libraries may contain only one type of sample. The use of reference standards, controls or calibration standards may also be performed, though it is not necessary. Further, a library may be defined to include sub-groups of members of different libraries, or it may include combinations of plural libraries. The samples of a library may be previously characterized, uncharacterized or a combination thereof, so that property information about the samples may not be known before screening.

Typically, for combinatorial science research applications, at least two or more, preferably at least four or more, even more preferably eight or more and, in many cases, most preferably each of the plurality of polymer samples in a given library of samples will be different from each other. Specifically, a different sample can be included within at least about 50%, preferably at least 75%, preferably at least 80%, even more preferably at least 90%, still more preferably at least 95%, yet more preferably at least 98% and most preferably at least 99% of the samples included in the sample library. In some cases, all of the samples in a library of samples will be different from each other.

In one embodiment, preferably at least eight samples are provided in a library on a substrate and at least about 50% of the samples included in the library are different from each other. More preferably, the library includes at least 16 samples and at least 75% of said samples included in said library are different from each other. Still more preferably, the library includes at least 48 samples and at least 90% of said samples included in the library are different from each other.

The substrate can be a structure having a rigid or semi-rigid surface on which or into which the library of samples can be formed, mounted, deposited or otherwise positioned. The substrate can be of any suitable material, and preferably includes materials that are inert with respect to the samples of interest, or otherwise will not materially affect the mechanical or physical characteristics of one sample in an array relative to another. Exemplary polymeric materials that can be suitable as a substrate material in particular applications include polyimides such as Kapton™, polypropylene, polytetrafluoroethylene (PTFE) and/or polyether etherketone (PEEK), among others. The substrate material is also preferably selected for suitability in connection with known fabrication techniques. Metal or ceramic are also possible substrate materials. Another suitable substrate is a silicon wafer that has been patterned to define a predetermined configuration on which the sample or samples are deposited (e.g., suspended deflectable arms). Preferably, the substrate is a continuous solid, but it may be porous, or if fibrous, then woven, unwoven, braided etc. The overall size and/or shape of the substrate is not limiting to the invention. The size and shape can be chosen, however, to be compatible with commercial availability, existing fabrication techniques, and/or with known or later-developed automation techniques, including automated sampling and automated substrate-handling devices. The substrate is also preferably sized to be portable by humans. The substrate can be thermally insulated, particularly for high-temperature and/or low-temperature applications.

In certain preferred embodiments, the substrate is formed to securely maintain contact with a plurality of samples. According to various methodologies it may be desirable to place forces on samples while the samples remain secured to the substrate. Forces may be applied to the samples by one or more applicators separate from the substrate or the substrate may apply the forces, (e.g., a substrate that is tensioned from its edges).

In one particularly preferred embodiment, the library includes a combinatorial library of polymerization product mixtures. Polymer libraries can comprise, for example, polymerization product mixtures resulting from polymerization reactions that are varied with respect to, for example, reactant materials (e.g., monomers, comonomers), catalysts, catalyst precursors, initiators, additives, the relative amounts of such components, reaction conditions (e.g., temperature, pressure, reaction time), post-synthesis treatment, or any other factor affecting polymerization or material properties. Design variables for polymerization reactions are well known in the art. See generally, Odian, Principles of Polymerization, 3rd Ed., John Wiley & Sons, Inc. (1991). A library of polymer samples may be prepared in parallel polymerization reactors or in a serial fashion. Exemplary methods and apparatus for preparing polymer libraries—based on combinatorial polymer synthesis approaches—are disclosed in copending U.S. patent application Ser. No. 09/211,982 of Turner, et al., filed on Dec. 14, 1998, copending U.S. patent application Ser. No. 09/227,558 of Turner, et al., filed on Jan. 8, 1999, copending U.S. patent application Ser. No. 09/235,368 of Weinberg, et al., filed on Jan. 21, 1999, and copending U.S. Provisional Patent Application Ser. No. 60/122,704 entitled "Controlled, Stable Free Radical Emulsion and Water-Based Polymerizations", filed on Mar. 9, 1999 by Klaerner, et al. See also, PCT Patent Application WO 96/11878.

Non-Polymer Sample Materials

Although several of the primary applications of the present invention are directed to combinatorial polymer science research and/or quality control for industrial polymer synthesis or processing protocols, some aspects of the invention can have applications involving non-polymer samples. A non-polymer sample can be a material that comprises an organic or an inorganic non-polymer element or compound. For purposes herein, oligomers are considered to be polymers rather than non-polymers. As examples, non-polymer samples may include metal samples, ceramic samples or any other non-polymer samples.

Sample Handling

Handling of sample materials may be accomplished with a plurality of steps which include withdrawing a sample from a sample container and delivering at least a portion of the withdrawn sample to a substrate. Handling may also include additional steps, particularly and preferably, sample preparation steps. In one approach, only one sample is withdrawn into a suitable liquid or solid dispensing device and only one sample resides in the probe at one time. In other embodiments, multiple samples may be drawn. In still other embodiments, multiple dispensers may be used in parallel.

In the general case, handling can be effected manually, in a semi-automatic manner or in an automatic manner. A sample can be withdrawn from a sample container manually, for example, with a pipette or with a syringe-type manual probe, and then manually delivered to a loading port or an injection port of a characterization system. In a semi-automatic protocol, some aspect of the protocol is effected automatically (e.g., delivery), but some other aspect requires manual intervention (e.g., withdrawal of samples from a process control line). Preferably, however, the sample(s) are withdrawn from a sample container and delivered to the characterization system in a fully automated manner—for example, with an auto-sampler.

In one embodiment, handling may be done using a microprocessor controlling an automated system (e.g., a robot arm). Preferably, the microprocessor is user-programmable to accommodate libraries of samples having varying arrangements of samples (e.g., square arrays with "n-rows" by "n-columns", rectangular arrays with "n-rows" by "m-columns", round arrays, triangular arrays with "r-" by "r-" by "r-" equilateral sides, triangular arrays with "r-base" by "s-" by "s-" isosceles sides, etc., where n, m, r, and s are integers).

Formation of Material Samples Suitable for Plastic Deformation

In general, libraries of material samples may be provided in a variety of forms prior to plastic deformation. Samples may be provided as fluids, solids, partial fluids, gasses, liquids, partial solids or a combination thereof, however, during deformation, the samples are preferably at least partially solid such that they may undergo plastic deformation.

According to one aspect, each of the samples of a library includes at least one surface suitable for receiving a force applied to the surface wherein the force is applied for plastically deforming the sample. The surface may be substantially planar or contoured but is preferably suitable for receiving a force applied by a member, by a fluid (e.g., a pressurized fluid) or otherwise.

Generally, samples may be formed in a variety of shapes or configurations. Exemplary configurations include blocks, squares, pyramids or the like. In one highly preferred embodiment, however, the samples of a library are formed as films. The term film, as used herein, denotes any material sample having at least two surfaces that at least generally oppose each other and are separated by a thickness of the sample. Formation of samples into films may be accomplished by a variety of art disclosed techniques such as drying, pressing rolling or the like. One highly preferred technique for forming the films includes casting of the films. Casting of the films may involve removing a solvent to solidify at least partially liquidized samples. An exemplary method of casting is disclosed in a commonly owned patent application titled, "High Thoughput Preparation and Analysis of Materials", Ser. No. 10/291,108 filed Nov. 8, 2002 herein fully incorporated by reference for all purposes. Another highly preferred technique for forming films includes melt pressing samples, in which a plastic is provided and heated to a molten state. While in the molten state, pressure is applied to form a sample. An exemplary method of melt pressing is disclosed in commonly owned patent application titled "High Throughput Preparation and Analysis of Materials", Ser. No. 10/291,108 filed Nov. 8, 2002.

Material Sample Plastic Deformation

The present invention contemplates the use of various suitable techniques for plastically deforming material samples that may be supported by substrates. As used herein, the term "plastic deformation" and any conjugations thereof are intended to mean any deformation of a material from an original shape to another shape wherein the material is incapable or substantially incapable of returning itself entirely to its original shape after the deformation.

Generally, samples may be plastically deformed by subjecting a portion of each of the samples to a force causing that portion of the sample to move relative to another portion of the sample. The portions of the sample may moved toward each other to thicken the sample, to increase the density of the sample or the like. Alternatively, the portions of the sample may be move away from each other to thin the sample, to decrease the density of the sample or the like. For moving the portions of the sample toward or away from each other, one portion may be kept stationary or both portions may be moved simultaneously.

The force may be applied to the samples using a variety of techniques. For example, and without limitation, one or more members (e.g., structural members) may contact the samples for applying the force. Alternatively, one or more fluids may contact the samples for applying forces to the samples by altering pressures adjacent the surfaces of the samples. In other alternatives, forces may be applied electrically, mechanically, chemically or the like. Moreover, the force may be a tension force, compressive force, a shear force or a combination thereof.

According to one preferred embodiment, one or more samples are provided as films with generally opposing faces. Thereafter, a pressure on one face of the film is raised or lowered relative to the pressure on the other face causing the film to deform toward the lower pressure. In one such embodiment, it is generally preferable for the samples to form substantially fluid tight seals between the fluids applying the pressures on their respective sides. However, it is contemplated that pressures may be maintained by flowing fluids relative to the samples and that fluid tight seals may not be needed or desired.

As can be appreciated, the deformation of the samples may include stretching and thinning of entire samples or local portions thereof, compressing and thickening of entire samples or local portions thereof, shearing the entire samples or local portions thereof or otherwise. Preferably, the deformation of the samples substantially simulates, in miniature scale, the deformation that is likely to occur in an industrial processing environment. Exemplary industrially significant deformation techniques may include, for example, molding such as blow molding, casting, injection molding (e.g., injection-stretch blow molding), compression molding, extrusion or the like.

It will also be appreciated that a research program in accordance with the invention disclosed herein may be designed to analyze the effect that factors other than, or in addition to the above conditions may have upon the performance of a particular material or process. Thus, prior to or during sample deformation, the samples may be exposed to a variety of conditions expected to effect (e.g., assist, hinder or otherwise alter) the plastic deformation of the samples. For example, and without limitation, a sample may exposed to one or more conditions to lower or increase the ductility, elasticity, plasticity, strength or the like of the sample. Exemplary conditions include exposure to an artificially elevated temperature, exposure to an artificially lowered temperature, exposure to variations in temperature, exposure to a fluid (e.g., a vapor) having a chemical capable of plasticizing the sample, exposure to chemicals or light designed to degrade the sample or exposure to other conditions. Variations of rates may also be the subject of analysis for measuring time-sensitive characteristics. Further, though disclosed herein in connection with plastic deformation of samples, the present invention is also useful for inducing elastic deformation without necessarily achieving plastic deformation.

Referring to FIG. 1, there is illustrated one exemplary apparatus 10 in accordance with a preferred embodiment of the present invention. The apparatus 10 is adapted to be used to deform material samples. The apparatus 10 includes a substrate 12 defining or supporting a vessel 14, which, in turn, defines an opening 16 in the substrate 12. The apparatus 10 also includes a fluid pressure controller 22 configured for supplying fluid pressure to or for removing fluid pressure from within the vessel 14. A suitable sensor 26 (e.g., a pressure sensor) is associated with the apparatus 10 for monitoring the positive or negative pressure supplied by the pressure controller 22.

In the embodiment shown, the substrate 12 is generally shaped as a block and the vessel 14 is generally cylindrical thereby providing the opening 16 as generally cylindrical or circular. It shall be recognized, however, that the substrate 12, vessel 14 and opening 16 may be provided in a myriad of shapes, configurations and sizes. The example shown is not intended as limiting. The pressure controller 22 is shown as including a piston 28, which may be actuated within a tubular structure or barrel 30 for increasing or decreasing the pressure within the vessel 14. In alternative embodiments, various assemblies may be used as the pressure controller 22. For example, and without limitation, the pressure controller may be a vacuum source for lowering pressure within the vessel 14, or the pressure controller may be a resistance heater for elevating the temperature of the fluid within the vessel 14 for expanding the fluid and raising the pressure within the vessel 14. It may cool a fluid for contracting the fluid. Other pressure controllers may include a source of pressurized fluid (e.g., a tank of pressurized fluid). Many other potential alternative pressure controllers, which may be employed in the present invention will be recognized by those of skill in the art.

A material sample 40 is placed over the opening 16 of the vessel 14. Samples may be delivered to the substrate 12 in a variety of ways. Samples may be provided as thin films, or they may be provided as liquids, (e.g., deposited on an optional support member having known characteristics or uniform characteristics across it, such as a film, a web or the like). Samples may be delivered manually or automatically. Alternatively, samples may be formed in-situ to cover the opening 16. In one embodiment, a frame 46 is adapted to sealingly contact the sample 40 adjacent peripheral edges of the sample 40. The frame may be provided in a variety of configurations suitable for attachment to the samples, either directly or indirectly. The sample 40 may be secured to the frame 46 and transported on the frame 46 to the substrate 12. Alternatively, the sample 40 may be placed directly upon the substrate 12. Thereafter, the frame 46 is preferably secured to the substrate 12, the sample 40 or both. Preferably, the sample 40 is secured over the opening 16 to form a substantially fluid-tight seal with the substrate 12, the vessel 14 or both.

Samples may also be secured over an opening using a variety of other techniques. As examples, samples may be secured to a substrate using an adhesive (e.g., about peripheral edge of the sample), fasteners, clamps or the like. The samples may also be placed upon the above-discussed support member and the support members mounted in a fixed position over the opening 16.

In cases, such as that shown in FIG. 1, where the sample 40 is in the form of a film with substantially opposing sides 50, it is preferable for the sample 40 to be situated relative to the opening 16 such that one of the sides 50 faces toward the opening 16 and is exposed, directly or via intermediate support member, to fluid within the opening 16 while the other side 50 faces away from the opening 16 and is exposed to fluid outside the vessel 14.

Once secured, and referring additionally to FIGS. 2(*a*)–2(*b*), the pressure within the vessel 14 is altered (i.e., raised or lowered) to deform the sample 40, for example by creating a pressure difference on opposing faces or sides of the sample. In FIGS. 2(*a*)–2(*b*), the pressure in the vessel 14 is raised above the pressure surrounding the outside of the vessel 14. The elevated pressure in the vessel 14 causes the sample to balloon or move away from the vessel 14, opening 16 or both. Upon application of sufficient pressure, this movement, in turn, causes the sample 40 to plastically deform. In the embodiment shown, the sample 40 is plastically formed into a substantially spherical shape. In this instance, the actual deformation of the sample 40 may be defined as being substantially uniform simultaneous biaxial extension. As used herein, the term biaxial extension means that, during deformation of the sample 40, the sample 40 is being extended in directions defined by at least two axes (e.g. perpendicular axes) lying in a plane of the sample. In the example shown, the biaxial extension is in a plane that is substantially tangent to the substantially spherical shape of the sample 40. Of course, the expansion of FIG. 2(*c*) may be further constrained by expansion into a cavity defined by one or more walls, such as for simulating or acting as a mold, as will be discussed.

As discussed previously, the sample 40 may be exposed to various conditions (e.g., heat, cold or the like) for assisting or hindering the plastic deformation of the sample 40. Exposure to such conditions may take place prior to, during or after formation of the sample 40. Moreover, exposure to such conditions may take place prior to, during or after securing the sample 40 over the opening 16.

In the example of FIGS. 2(*a*)–2(*b*), the sample 40 was biaxially deformed both substantially uniformly and substantially simultaneously. However, certain commercially significant processes, in addition to biaxial deformation, may plastically deform materials in a variety of directions at a variety of different times. For example, the expansion of a parison in a blow molding operation will generally be constrained by the walls defining a mold cavity. Thus for certain combinatorial research programs, it may be desirable to employ one or more members or structures for assisting in controlling the directions of deformation of samples, in one or more of the x, y and z orthogonal axes. Such controlled deformation may be consistent throughout, or may be varied in a sequence, for example.

Deformation may be limited in substantially a first direction followed sequentially by limiting the deformation in substantially a second and or third direction. As further examples, structures may be employed to assist in limiting deformation of samples to be substantially uniaxial (i.e., in directions defined by a single axis) biaxial, or substantially triaxial (i.e., in directions defined by three axes such as the traditional x-y-z axes). Moreover, materials may be plastically deformed directionally or axially simultaneously, as previously shown, or directionally or axially sequentially (i.e., deformation in one or more directions or along one or more axes followed by deformation in one or more different directions or along one or more different axes).

Suitable structures for assisting in controlling the plastic deformation of samples or portions thereof may come in a variety of shapes, sizes and configurations. Preferably, the members provide one or more walls that contact the samples during deformation for substantially limiting deformation in one or more directions or along one or more axes while still substantially allowing deformation in a different one or more directions or along a different one or more axes. Members for controlling plastic deformation may be molds, casts, panels or the like. For example, and without limitation, a mold may be designed to include a cavity having one or more walls for guiding the deformation samples. Such cavities may be supplied in a variety of shapes and configurations such as pyramids, cones, arches, arcs or other continuous shapes, discontinuous shapes, patterns or the like. In one preferred embodiment, a square or rectangular cavity is provided wherein the corners of the cavity have been rounded. It is also possible that a plurality of different configurations are employed, for analyzing the response of a material to different mold or, different cavity types.

Since the member or molds typically contact the samples for controlling the deformation of the samples, it may be desirable to provide a lubricant to the surfaces of the molds or members that will contact the samples. The lubricant may be chosen from a variety of oils, silicon based lubricants or the like and may be applied as a spray, blotted on, brushed on or otherwise applied. Such lubricants will typically ease removal of the samples from the members or molds after sample deformation.

Figure 2A:
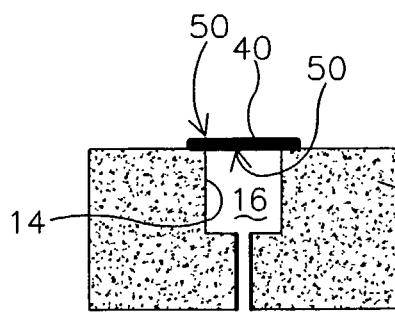
FIGS. 2(a)–2(c) illustrate, schematically, a sample being processed according to one exemplary method of the present invention.
Figure 2B:
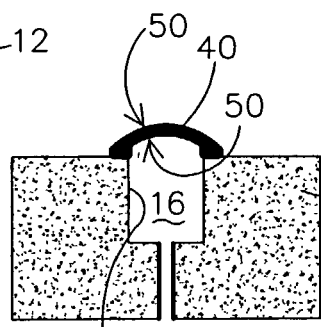
Figure 2C:
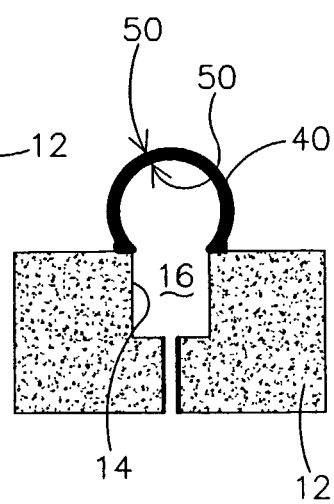
Figure 3A:
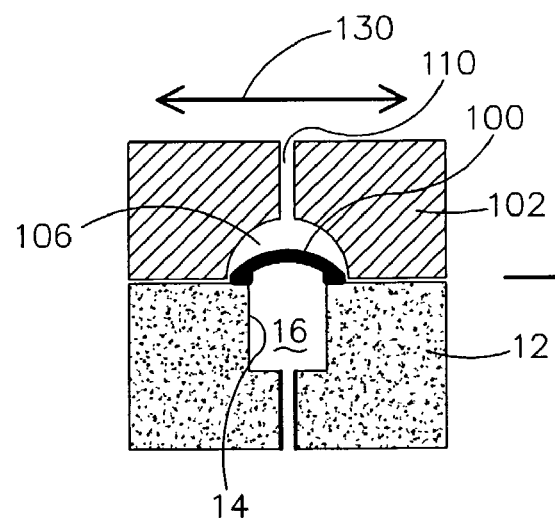
FIGS. 3(a)–3(d) illustrate, schematically, a sample being processed according to another exemplary method of the present invention.
Figure 3B:
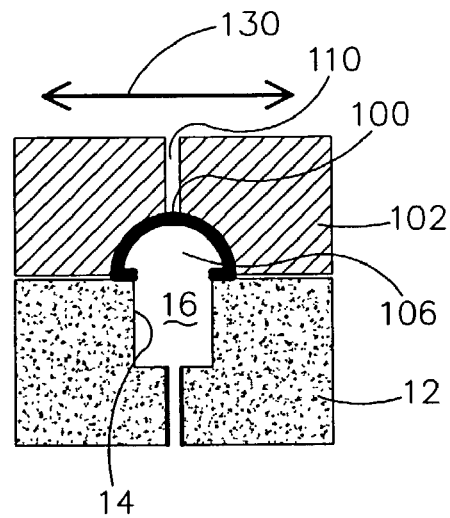
Figure 3C:
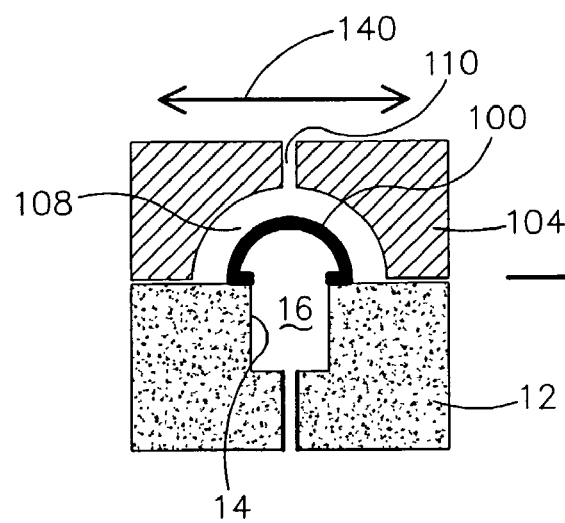
Figure 3D:
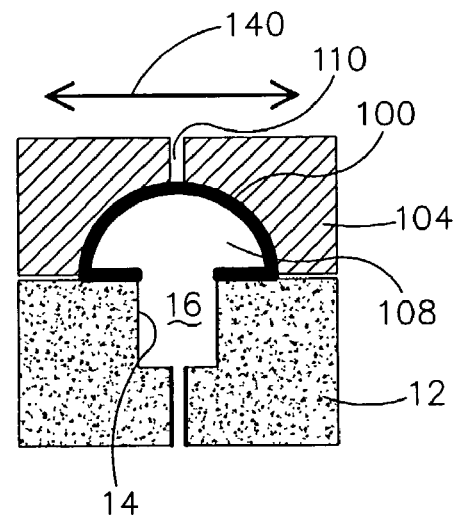

Referring to FIGS. 3(a)–3(d), a sample 100 similar to the sample 40 of FIGS. 2(a)–2(c) is being plastically deformed in a multi-step process, using substantially identical techniques as previously described except that one or more structures are used to assist in controlling the deformation of the sample 100. The structures, in this example include plural different cavities that are each used at a different stage of the deformation. That is, the sample 100 is deformed against a first mold 102, which is then replaced by a second mold 104. The first and second molds may be the same or different. For example, a single mold of variable cavity sizes may be used and molding interrupted to adjust cavity of the mold. Alternatively, different molds can be used, which are exchanged with each other during processing.

In FIGS. 3(a)–3(d), the first mold 102 and the second mold 104 each are generally block shaped. The molds 102, 104 each include an opposing similarly shaped cavity (e.g., substantially semi-cylindrical cavities 106 and 108) formed therein. Preferably, the cavity 108 of the second mold 104 is larger than the cavity 106 of the first mold. In the embodiment shown, each of the molds 102, 104 also includes a passageway 110 from is respective cavity 106, 108 to the atmosphere outside the mold 102, 104. Advantageously, the passageway 110 can assist in maintaining a substantially constant pressure on at least one side of the sample 40. However, because the passageway 110 may undesirably participate in deformation of the sample 40, it may be desirable to locate the passageway 110 as to avoid having the passageway interact with portions of the sample 40 that will later be screened. For example, it may be desirable to position the passageway 110 away from the center of the cavities 106, 108 of the molds 102, 104.

In operation, the first mold 102 is situated in a first position over the sample 100 after the sample 100 is secured over the vessel 14 or opening 16 of the substrate 12. Thereafter, the fluid pressure in the vessel 14 is elevated to plastically deform the sample 100. During deformation, the sample 100 substantially assumes the shape of the semi-cylindrical cavity 106. In doing so, and with additional reference to FIG. 4, which shows sample 100 after deformation, a substantially centralized portion 120 of the sample 40 is substantially uniaxially and plastically deformed in directions along a first axis 130.

Next, the second mold 104 is situated in a second position over the sample 100 while the sample 100 remains secured over the vessel 14 or opening 16 of the substrate 12. Preferably, in the second position, the second mold 104 is oriented such that the semi-cylindrical shape of its cavity 108 is oriented 90 degrees (e.g., perpendicular) relative to the semi-cylindrical shape of the cavity 106 of the first mold 102 when the first mold 102 is in the first position. Thereafter, the fluid pressure in the vessel 14 is elevated to again plastically deform the sample 100.

During deformation, the sample 100 substantially assumes the shape of the cylindrical cavity 108 of the second mold 104. In doing so, and again additionally referring to FIG. 4, the substantially centralized portion 120 is substantially uniaxially and plastically deformed in directions along a second axis 140. Thus, at least the centralized portion 120 of the sample 100 has been substantially biaxially deformed and such deformation has taken place sequentially. Advantageously, such deformation simulates many industrially useful processes. Once the centralized portion 120 has been sequentially biaxially deformed, it may, optionally, be removed (e.g., cut out) from the rest of the sample 100 and preserved as desired for further experimentation.

While the apparatus 10 and/or substrate 12 of FIGS. 1–3(d) have been illustrated as primarily plastically deforming samples serially (e.g., one at a time), it shall be recognized that samples may be plastically deformed in parallel (e.g., more than one at the same time) or combinations of serial and parallel (e.g., a plurality of samples in a first time period followed another plurality of samples) methods may be used as well. It shall be further recognized that with the information provided in this disclosure the methods, techniques and hardware discussed above may be adapted for parallel techniques, serial-parallel techniques or both.

Figure 5B:
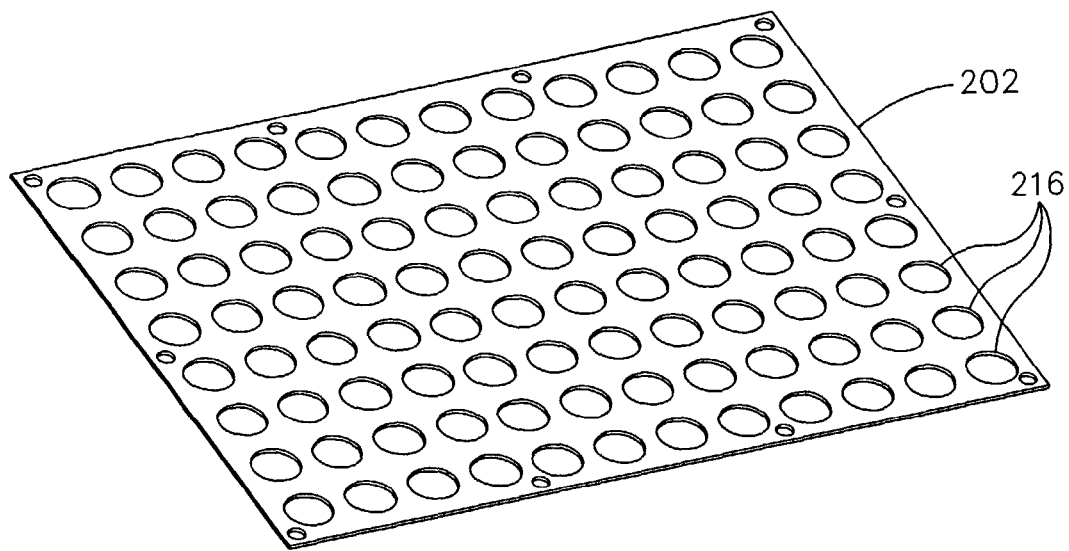
FIGS. 5(a)–5(b) illustrate a perspective view of an alternative apparatus for forming material samples according to the present invention.
Figure 5A:
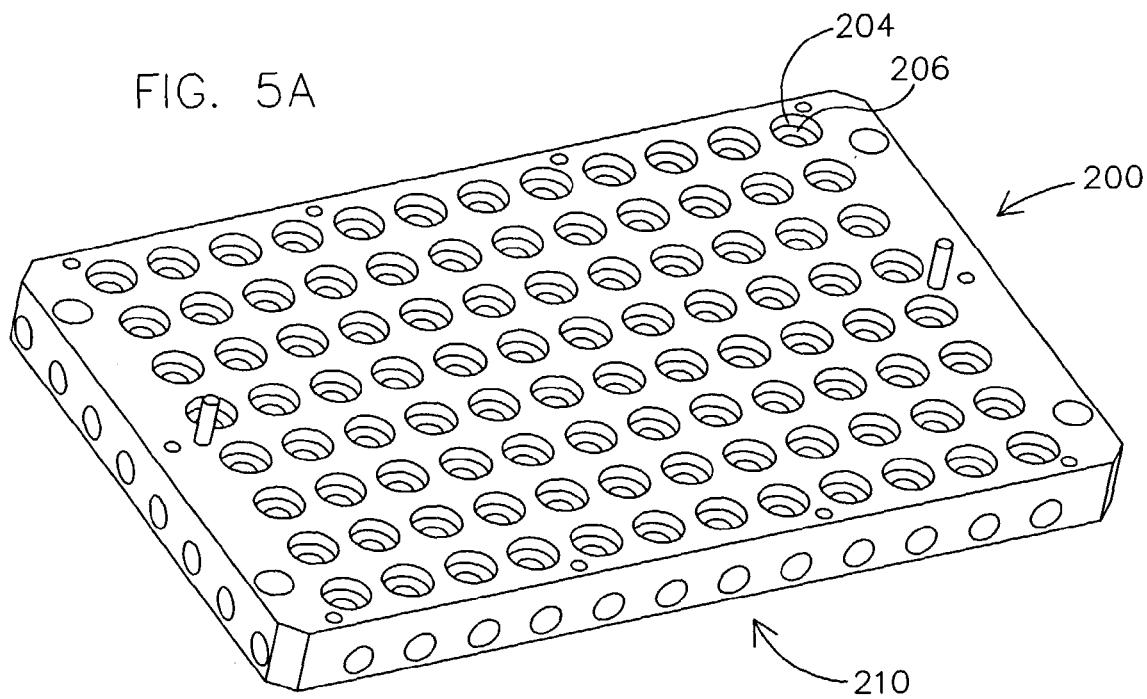

Referring to FIGS. 5(a)–5(b), there is illustrated a substrate 200 and a clamp or frame 202 suitable for plastically deforming a plurality of samples in parallel. The substrate 200 includes a plurality of vessels 204, each vessel 204 defining an opening 206, over which samples may be positioned. The substrate 200 also includes a plurality of inlets 210 for connecting the vessels 204 to one or more fluid pressure supplies or controllers (not shown). As shown, the frame 202 includes a plurality of through-holes 216 corresponding to the vessels 204 of the substrate 200.

In operation, a plurality of samples may be positioned over the plurality of vessels 204 and be secured in place by the frame 202. Thereafter, the pressure controllers can supply increased or vacuum pressure to plastically deform the samples as previously described. It is contemplated that various configurations of substrates may be used in the present invention. In one embodiment, each of the vessels 204 may be connected to a single fluid pressure supply that simultaneously provides pressure within each of the vessels. Alternatively, each vessel or groups of vessels may be connected to a single pressure supply wherein the amount of pressure supplied to each or groups of the vessels is separately controllable. As another alternative, each of the vessels or groups of the vessels may be connected to a plurality of separately controllable pressure supplies.

In a situation where a plurality of vessels are in fluid communication with a single pressure supply that provides simultaneous pressure to a plurality of vessels (e.g., through a manifold), failure or rupture of one sample may cause a loss of pressure for all the samples. Thus, in such a situation, it is contemplated that one or more additional membranes may be placed over the vessels wherein the membranes are flexible such that they can reasonably freely elastically deform, but which are relatively strong and unlikely to experience failure or rupture. Samples may then be secured on the membranes such that the samples can plastically deform as the membranes elastically deform.

It is further contemplated that a plurality or library of samples (e.g., films) may be formed directly on or otherwise placed upon a single or multiple membranes and that the membrane[s] (with the samples) may be transported to one or more vessels, substrates or both followed by securing of the membrane[s] and the sample[s] over the vessels or openings. Thereafter, the samples may be deformed as described above. Suitable materials for these membranes may include various polymers, plastomers, elastomers or the like. One exemplary material is silicone rubber, which may be fluorinated.

Materials Characterization

Characterization of materials samples may take place during plastic deformation of the samples or after deformation. Preferably, the deformation of the samples, in some way, affects a property or characteristic of the samples for which materials characterization is being performed. For materials characterization, the samples may be formed in a variety of sizes and weights. For example, samples may have thicknesses as low as about 0.1 micron to about 25 mm. Moreover, exemplary ranges of weights for specimens include ranges of about 1 microgram to about 0.5 kilogram or about 1 mg to about 100 mg or about 10 mg to about 80 mg.

In one preferred embodiment, one or more moduli (e.g., tensile elastic moduli) may be determined during plastic deformation of the samples. Moreover, dynamic moduli may also be determined during deformation by applying variant pressure (e.g., pressure that varies sinusoidally) to plastically deform the samples. For determination of such moduli, and referring to FIG. 1, the pressure in the vessel 14 may be monitored using the sensor 26 and the pressure may be correlated to the deformation of the samples. Exemplary techniques for determining such moduli are disclosed in commonly owned copending patent applications: "High Throughput Mechanical Property and Bulge Testing of Materials Libraries", Ser. No. 09/939,404, filed Aug. 24, 2001.

In other embodiments, libraries of materials may be plastically deformed followed by material characterization at a later time. The libraries of material in accordance with the present invention lend themselves to any of a number of art-disclosed characterization techniques including but not limited to those employing beam radiation analysis, such as x-ray diffraction, high-throughput x-ray scattering, scattering from experimental systems, viscometry, rheology measurements, failure or strength testing, adhesion testing, birefringence, rheo-optics, electron radiation, neutron radiation, synchrotron radiation, or the like, infrared techniques (e.g., FTIR, IR detection or otherwise), thermal analysis techniques (such as differential scanning calorimetry, differential thermal analysis or the like), chromatographic techniques, resonance, spectroscopy, light scatter, spectrometry, microscopy, nuclear magnetic resonance, optical measurements, electrochemical measurements. By way of example, X-ray diffraction (XRD) and X-ray fluorescence (XRF) can be used in combination to determine the material crystal structure and composition, respectively. Other suitable screens might be gleaned from commonly owned U.S. Pat. Nos. 5,776,359; 5,959,297; 6,013,199; 6,034,775; 6,087,181; 6,151,123; 6,157,449; 6,175,409; 6,182,499; 6,187,164; 6,225,487; 6,248,540; 6,256,226; 6,260,407 and U.S. application Ser. Nos. 60/300,792, filed Jun. 25, 2001; 09/680,154; 09/215,417; 09/667,119, 09/939,252, 09/580,024, and 60/314,842 (all of which are hereby incorporated by reference), as well as other commonly owned patent properties.

Samples may also be analyzed using art-disclosed techniques, for any of a number of different physical properties, such as tensile strength testing, impact strength testing, tear resistance testing, density testing, tack testing, viscoelastic modulus testing, rheology testing, viscosity testing, bulge testing, probe perturbation testing, flexure testing, optical testing, hardness testing, melt index testing, flow index testing, glass transition testing, melting point testing, die swell testing, order-disorder transition temperature testing, order-order transition temperature testing, fluid permeability testing, electrical property testing (e.g., dielectric constant) or other testing. Examples of such analytical techniques can be found in commonly owned U.S. patent application Ser. Nos. 09/939,149, (filed Aug. 24, 2001); 09/939,263, (filed Aug. 24, 2001); 09/938,994, (filed Aug. 24, 2001); 09/939,252, (filed Aug. 24, 2001); 09/939,404, (filed Aug. 24, 2001); 09/210,086, (filed Dec. 11, 1998); 09/954,449 (filed Sep. 17, 2001) (all of which are hereby incorporated by reference for all purposes). Other thermal or electrical properties may be analyzed such as conductivity, resistivity, or the like.

Samples may also be analyzed for response to cyclic loading, weatherability, or other conditions for simulating actual operating conditions for a particular application. In yet another embodiment, materials are analyzed for their recycleability attributes.

It is also expected that characterization may also be employed using other art-disclosed techniques, including optical microscopy, scanning electron microscopy, or other microscopy techniques.

For at least some of the screening techniques disclosed above, one or more stimuli are applied to the samples. Exemplary stimuli include force, pressure, light, chemical exposure or the like. During or after the application of the stimuli, the samples are monitored for a response to the stimuli. Such responses may include deformation, failure, reflection, refraction, resistance, flow rate, chemical reaction or the like. Then, the responses of the samples may be related to the properties or characteristics discussed above.

Thus, it can be seen how those of skill in this art can effectively utilize the methods of this invention for a combinatorial materials science research program.

Automation

Though manual methods are possible, the preparation and analysis of test samples is typically performed in at least a partially automated manner, and is facilitated by the use of suitable software. Though it is possible that several functions may be combined into an integrated software package, it is anticipated that the software will likely be packaged as separate modules, or as a group of separate modules together in a suite. Though any suitable software may be employed, preferred software is that available from Symyx Technologies, Inc. (Sunnyvale, Calif.), under the designations identified parenthetically in the following discussion.

In general, software is employed in at least the following processing steps:

1) designing a library (e.g. with LIBRARY STUDIO™);

2) translating a library design into commands for directing robots or other instrumentation to prepare test sample and thereafter process them (IMPRESSIONIST™);

3) acquiring data about test specimens in a library (EPOCH™); and 4) organizing and displaying test specimen data for search or analysis (POLY VIEW™).

A more detailed discussion of the features and operation of sample preparation or processing software can be found in U.S. patent application Ser. Nos. 09/420,334 (filed Oct. 18, 1999); 09/174,856 (filed Oct. 19, 1998); 09/305,830 (filed May 5, 1999), incorporated by reference herein for all purposes.

Further, it is also contemplated that any suitable commercially available software will be employed for storing and retrieving test specimen data (e.g., database software available from ORACLE), correlating test specimen data with information about a test specimen or other test specimens in a library, or both. For example, for each test specimen, the information obtained preferably is inputted and stored into a computer, which can retrieve such information for subsequent analysis or comparison with other library members.

By way of further background, in the context of the present invention, preferably library design will employ software including graphical user interface for designing a library. The software may provide a navigational interface pane for permitting a user to access, view and edit a design of a particular library (including information about its constituent members, such as composition). The software preferably provides a formatted work pane for prompting a user to input data about desired characteristics of a library member. The software also preferably provides a formatted definition pane, pursuant to which users are prompted to define or specify stock materials, chemical concentrations, reaction conditions or the like. The software is capable if storing such data once inputted. In this manner, by way of example, a user is able to design a library of reagent formulations or synthesis products by mapping gradients across a matrix (e.g., by amount such as volume); alternatively, individual or subsets of cells can be mapped within one or more plates across a matrix using equations (e.g., by volume, mass, moles, mmoles, mole/l, mmole/l or the like). Preferably the software allows for the input of data for design of a single library or a plurality of libraries, as might span across multiple physical plates.

It will also be appreciated that in the design of an experiment, composition need not be the only variable within a library, or across plural libraries. Other variables include, without limitation, addition sequence, addition time, addition rate, temperature history, mixing type, mixing speed, mixing torque, shear strain, elongational strain, mixing history, cure history, environment, residence time distribution or the like. In a preferred embodiment, an experiment is performed with varying composition. In another preferred embodiment, an experiment is performed with a common composition and variation of at least one, and preferably two, more preferably three, and still more preferably four or more of the above variables. In yet another preferred embodiment, an experiment is performed with a varying composition and variation of at least one, and preferably two, and more preferably three, and still more preferably four or more of the above variables.

As indicated, it is desirable to automate library preparation by employing suitable software for translating a library design into commands for directing robots or other instrumentation to prepare test specimens and thereafter process them. In general, this software will interface between the library design software and the automated instruments that are used for preparing the libraries. Thus, the software will translate data inputted for a particular library member or members into a signal for assisting in controlling the automated instruments. By way of example, data inputted for the design of a proposed library member might require that a first component and a second component, both the first and second components being kept at separate sites, be dispensed in certain proportions onto a common region of substrate. Preferably the present software will direct an instrument, such as a test specimen handling robot (e.g., a CAVRO™ robot), to translate one or more dispensers to collect the first component and the second components and deliver them to the designated region of the substrate. Likewise, the software preferably permits for controlling post-deposition processing or possibly analysis (or test specimen processing where there has been no deposition), in like manner. Suitable software is also employed for assisting in the performance of test specimen analysis, such as for instance the high throughput testing or characterization of a test specimen.

Data Analysis

Another aspect of the present invention involves correlating the data received from the test sample analysis or other screen with information known about ingredients of each of the materials, processing conditions of each of the materials or a combination thereof. The respective test specimens of one or more libraries can be compared with each other based upon the data and ranked. In this manner, a large field of research candidates can be narrowed to a smaller field by identifying the candidates that perform better than others with respect to a predetermined property, structure, or figure of merit. Comparative review of results might lead to rankings of performance from better to worse, or the like. Likewise, a large field of research candidates can be narrowed to a smaller one by identifying those that meet a certain predetermined criteria. Additional libraries can then be prepared for further analysis. Alternatively, bulk quantities of materials having the desired properties or structures can be made for commercial applications. Data analysis may be performed manually, or by semi-automated or automated techniques. For example, it is possible to employ either or both of the LIBRARY STUDIO®(from Symyx Technologies, Inc.) and IMPRESSIONIST® (from Symyx Technologies, Inc.) for library design and synthesis, and POLYVIEW™(from Symyx Technologies, Inc.) or other suitable data management software to assist in correlating the data. Further, it is contemplated that data obtained from the use of the present invention can be used to develop data bases, such as a crystallography data base, or can be used for further interpretation or modeling.

It will be appreciated that the correlating protocol may be executed by suitable software. For instance, much of the above information typically will be inputted into a computer in the course of designing a library, (e.g. using software such as previously described LIBRARY STUDIO®), or in the course of programming or otherwise directing an instrument for exercising an operation upon a material (e.g. through the use of software such as IMPRESSIONIST®).

In this manner it is possible to store, retrieve, organize or otherwise manage information about many test specimens.

Further it is possible to analyze trends of different materials, or plural test specimens of the same material that has been subjected to different processing parameters or other conditions. An entire design space may be analyzed rapidly.

Preferably, the information is outputted for visual analysis. Trends can readily be analyzed within a single plot, or alternatively among different plots. In one embodiment, the plot may include only test specimens from a single library. In another embodiment the plot includes test specimens from different libraries. One exemplary plot is shown in FIG. 6 wherein deformation radius for a library of samples is plotted against the amount of pressure used to obtain the deformation radius.

Relative test specimen comparisons may be made form analyzing individual data points, or the data point may be confined to an analysis of whether a certain predetermined condition has been met. Materials may then be ranked according to the respective information known about them.

By way of illustration, suppose a library has five test specimens (or a multiple thereof). For illustration purposes, each test specimen is different from each other test specimen by the relative concentrations of their ingredients A and B (of course one or more other variables might be used instead of concentration) according to

TABLE I

| Test specimen | A | B | Crystalline (yes/no) | Mechanical Property | Mechanical Property Rank |
|---|---|---|---|---|---|
| 1 | 0 | 100 | No | 100 | 3 |
| 2 | 25 | 75 | No | 110 | 2 |
| 3 | 50 | 50 | Yes | 150 | 1 |
| 4 | 75 | 25 | Yes | 70 | 4 |
| 5 | 100 | 0 | No | 60 | 5 |

As can be seen relative performance of different samples might be evaluated, as might be whether a predetermined criteria is satisfied, or possibly the specific quantitative data observed from the analysis.

It may also be possible to store the information about a library for future retrieval (e.g. more than one day, one week, one month, or even one year after characterization). Materials that do not meet a specified characteristic in the present may thereafter meet such specification. For example, referring to the Table I, it may be determined at some future date that a need exists for a material comprised of A and B that is crystalline but does not have a mechanical property amount greater than 75. A query of a database including the information of Table I would identify Test specimen 4 as meeting this criteria. Information about the concentration or other parameters of Test specimen 4 could be retrieved and the material further analyzed.

Under any approach, it is also contemplated specifically that materials that satisfy certain criteria, perform better than others for a desired location or a combination thereof, can be identified for further study. Such further study might include further test specimen preparation and screening, the preparation of pilot- or bench-scale quantities or even the preparation of bulk quantities, (e.g. an amount sufficient to meet the demand of an industrial-scale application, for instance, such as a commercial application where the material is to be processed into useful or salable article). Depending upon the intended application, a bulk quantity may be as small as 1 kg or less, but typically will be larger than about 10 kg, more preferably larger than about 100 kg and still more preferably larger than about 1000 kg and still more preferably greater than about 10,000 kg.

Throughput

Throughputs obtainable according to the present invention preferably are high, and more preferably are higher than other art disclosed methods. Throughput will depend upon any of a number of different factors, including but not limited to the number of test specimens in a library. The size of the test specimens, the number of different characterizations performed upon given test specimen or the like. In one highly preferred embodiment, a test specimen or library of test specimens is prepared and characterized for only one of morphology, size, physical property or mechanical property. Preferably test specimen preparation throughput averages no more than about 8 hours per test specimen, more preferably no ore than about 4 hours per test specimen, still more preferably no more than about one hour per test specimen, and even still more preferably no more than about 0.25 hour per test specimen, and even still more preferably no more than about 0.1 hour per specimen.

For an embodiment in which a test specimen or library of test specimens is prepared and characterized for two or more of morphology, size, physical property or mechanical property, test specimen throughput averages no more than about 12 hours per test specimen, more preferably no more than about 6 hours per test specimen, still more preferably no more than about 1.5 hours per test specimen, and even still more preferably no more than about 0.4 hours per test specimen.

From the above, it will be readily appreciated how the present invention advantageously is employed in the rapid preparation and analysis of one or a plurality of new but uncharacterized materials. The invention may also be employed for the rapid analysis of existing known materials. In another embodiment, a combination of known and unknown materials are rapidly prepared or analyzed, such as by the use of a reference control or standard in a library of materials.

Throughputs may also be made more efficient through the employment of commercially available technology from Symyx Technologies, Inc., such as the PPR™ polymerization reactor technology, for the preparation of polymers.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

The invention claimed is:

1. A method for high throughput preparation and characterization of materials, comprising the steps of:
   (a) providing a plurality of material samples including at least 4 samples;
   (b) forming the plurality of material samples into a plurality of films;
   (c) plastically deforming the plurality of films with an automated system comprising:
      i. at least one vessel with at least one opening;
      ii. an automated handling device for delivering the plurality of samples to the at least one opening of the at least one vessel; and
      iii. a pressure controller in fluid communication with the at least one vessel, wherein the automated system handling device delivers samples to the opening and the pressure controller raises or lowers pressure within the at least one vessel for plastically deforming the plurality of samples; and
   (d) screening the plurality of films to determine at least one characteristic of each of the plurality of material samples wherein the characteristic is affected by the step of plastically deforming the plurality of films.

2. A method as in claim 1 wherein the plurality of samples are each at least partially formed of a polymeric material.

3. A method as in claim 1 wherein the step of plastically deforming the plurality of films includes extending at least a portion of the plurality of samples.

4. A method as in claim 1 wherein step (d) is performed at least partially simultaneously with step (c).

5. A method as in claim 1 wherein step (d) is performed serially relative to step (c).

6. A method as in claim 1 wherein the step (c) includes extending at least a portion of the plurality of samples in a first direction followed by extending at least a portion of the plurality of samples in a second different direction.

7. A method as in claim I wherein the step (c) includes uniformly simultaneously biaxially deforming at least a portion of the plurality of samples.

8. A method as in claim 1 further comprising elevating the temperature of said plurality of samples.

9. A method as in claim 1 wherein the step of plastically deforming the plurality of films is accomplished without the film experiencing failure or rupture.

10. A method as in claim 9 wherein the step of plastically deforming the plurality of films includes stretching and thinning the films.

11. A method for high throughput preparation and characterization of materials, comprising the steps of:
(a) providing a plurality of polymer-based material samples,
(b) forming the plurality of material samples into a plurality of films;
(c) plastically deforming the plurality of films by:
(i) securing the plurality of films over a plurality of openings of one or more vessels defined in a substrate thereby forming a substantially fluid-tight seal over the a plurality of openings; and
(ii) elevating the pressure within the one or more vessels thereby simultaneously deforming the each of the samples away from the one or more vessels; and
(d) screening the plurality of films to determine at least one characteristic of the plurality of material samples wherein the characteristic is effected by the step of plastically deforming the plurality of films.

12. A method as in claim 11 wherein the step of plastically deforming the plurality of films includes extending at least a portion of the plurality of samples.

13. A method as in claim 11 wherein step (d) is performed at least partially simultaneously with step (c).

14. A method as in claim 11 wherein step (d) is performed serially relative to step (c).

15. A method as in claim 11 wherein the step (c) includes extending at least a portion of the plurality of samples in a first direction followed by extending at least a portion of the plurality of samples in a second different direction.

16. A method as in claim 11 wherein the step (c) includes uniformly simultaneously biaxially deforming at least a portion of the plurality of samples.

17. A method as in claim 11 further comprising elevating the temperature of said plurality of samples prior to step (c).

18. A method as in claim 11 further comprising exposing the plurality of samples to a fluid capable of plasticizing the plurality of samples during step (c).

19. A method for high throughput preparation and characterization of materials, comprising the steps of:
(a) providing at least 16 polymer-based material samples by automatically dispensing the material samples with a robot;
(b) forming the at least 16 material samples into at least 16 films;
(c) plastically deforming the at least 16 films by:
(i) securing the at least 16 films over one or more openings of one or more vessels defined in a substrate thereby forming a substantially fluid-tight seal with the at least 16 films over the one or more openings;
(ii) elevating the pressure within the one or more vessels thereby deforming the at least 16 films away from the one or more vessels wherein one or more molds is positioned above the one or more openings to assist in extending the at least 16 films in a first direction;
(iii) situating the one or more molds in a second position relative to the at least 16 films;
(iv) elevating the pressure within the one or more vessels a second time thereby deforming the at least 16 films away from the one or more vessels wherein the one or more molds is positioned above the one or more openings to assist in extending the at least 16 films in a second direction;
(d) combinatorially screening the plurality of films to determine at least one characteristic of the plurality of material samples wherein the characteristic is effected by the step of plastically deforming the plurality of films.

20. A method as in claim 19 wherein the one or more molds include a cavity formed therein.

21. A method as in claim 20 wherein one or more molds include a passageway extending from the cavity to the atmosphere outside the mold.

22. A method as in claim 21 wherein the cavity of the one or more molds is substantially semi-cylindrical in shape.

* * * * *